(12) United States Patent
Landrieve

(10) Patent No.: US 11,300,160 B2
(45) Date of Patent: Apr. 12, 2022

(54) BEARING WITH GLIDING TARGET AND ASSOCIATED SENSOR

(71) Applicant: Aktiebolaget SKF, Gothenburg (SE)

(72) Inventor: Franck Landrieve, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/094,590

(22) Filed: Nov. 10, 2020

(65) Prior Publication Data

US 2021/0156431 A1 May 27, 2021

(30) Foreign Application Priority Data

Nov. 25, 2019 (DE) .......................... 102019218143.0

(51) Int. Cl.
| | | |
|---|---|---|
| *F16C 19/38* | (2006.01) | |
| *F16C 19/52* | (2006.01) | |
| *F16C 33/60* | (2006.01) | |
| *F16C 41/00* | (2006.01) | |

(52) U.S. Cl.
CPC .......... *F16C 41/008* (2013.01); *F16C 19/381* (2013.01); *F16C 19/522* (2013.01); *F16C 33/60* (2013.01); *F16C 2300/14* (2013.01); *F16C 2360/31* (2013.01)

(58) Field of Classification Search
CPC ...... F16C 19/381; F16C 19/522; F16C 33/60; F16C 41/00; F16C 41/008; F16C 2233/00; F16C 2300/14; F16C 2352/00; F16C 2360/31
USPC ....... 384/448, 455, 548, 561, 565, 570, 577, 384/579, 906; 324/174, 207.25
See application file for complete search history.

(56) References Cited

U.S. PATENT DOCUMENTS

| | | | | |
|---|---|---|---|---|
| 7,733,083 | B2 * | 6/2010 | Ozaki ................. | B60B 27/0026 |
| | | | | 324/207.25 |
| 7,982,455 | B2 * | 7/2011 | Ito .......................... | G01P 3/487 |
| | | | | 324/207.25 |
| 9,863,477 | B2 * | 1/2018 | Mol ....................... | F16C 19/06 |
| 10,041,545 | B2 | 8/2018 | Nicolas et al. | |
| 2002/0097040 | A1 * | 7/2002 | Takizawa .............. | F16C 19/527 |
| | | | | 324/174 |
| 2006/0243150 | A1 * | 11/2006 | Landrieve ........... | G01M 13/023 |
| | | | | 101/494 |

(Continued)

FOREIGN PATENT DOCUMENTS

| | | | | |
|---|---|---|---|---|
| DE | 202012011902 U1 * | 1/2013 | ............. | G01B 21/16 |
| EP | 1528356 B1 * | 1/2015 | ............ | G01M 13/04 |

(Continued)

*Primary Examiner* — Marcus Charles
(74) *Attorney, Agent, or Firm* — Garcia-Zamor Intellectual Property Law; Ruy Garcia-Zamor; Bryan Peckjian

(57) ABSTRACT

A bearing providing a first ring and a second ring capable of rotating concentrically relative to one another, at least one annular groove being formed on the second ring and oriented towards the first ring. The bearing further providing at least one target element engaged inside the groove of the second ring while being freely gliding inside the groove in the circumferential direction, the target element protruding into a hole formed on the first ring so that the target element is blocked in rotation by the first ring when the second ring rotates and the first ring is fixed, and at least one sensor mounted on the first ring and facing the target element to detect axial positions of the target element.

9 Claims, 3 Drawing Sheets

(56) References Cited

U.S. PATENT DOCUMENTS

2009/0256551 A1    10/2009  Ito et al.

FOREIGN PATENT DOCUMENTS

| | | | | |
|---|---|---|---|---|
| FR | 2861458 A1 * | 4/2005 | ......... | G01D 5/24476 |
| FR | 3041396 B1 | 3/2018 | | |
| WO | WO-2006100880 A1 * | 9/2006 | ............ | F16C 19/522 |
| WO | 2010028630 A1 | 3/2010 | | |
| WO | WO-2010028630 A1 * | 3/2010 | .............. | F16C 19/52 |
| WO | WO-2017222013 A1 * | 12/2017 | ............. | G01D 5/245 |

* cited by examiner

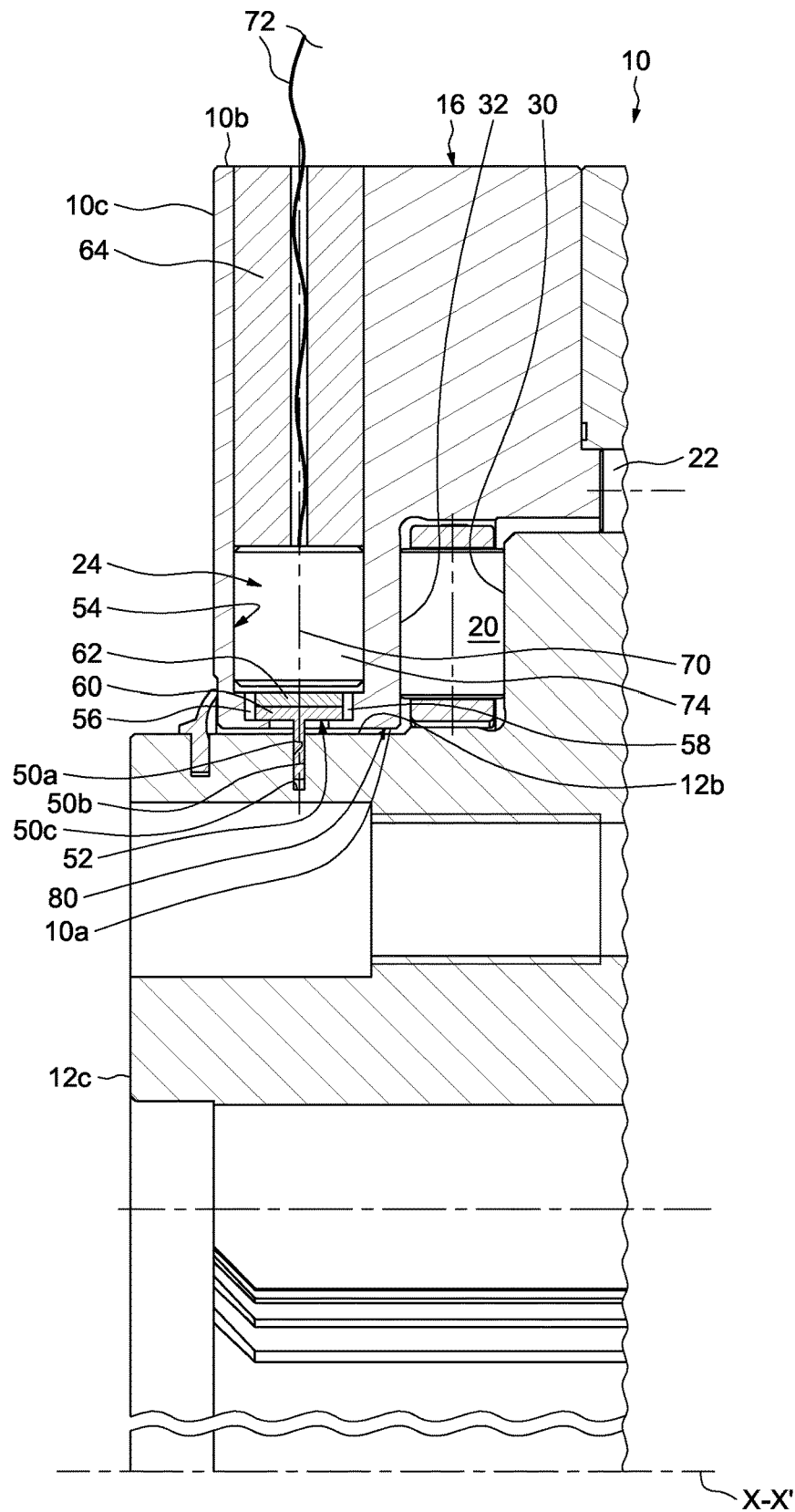

BEARING WITH GLIDING TARGET AND ASSOCIATED SENSOR

CROSS-REFERENCE TO RELATED APPLICATIONS

This application claims priority to German Patent Application no. 102019218143.0, filed Nov. 25, 2019, the contents of which is fully incorporated herein by reference.

TECHNICAL FIELD OF THE INVENTION

The present invention relates to the field of bearings. The invention notably relates to the field of large-diameter rolling bearings that can accommodate axial and radial loads, and having an inner ring and an outer ring arranged concentrically about an axis of rotation running in an axial direction.

BACKGROUND OF THE INVENTION

Such large-diameter rolling bearings may be used for example in a tunnel boring machine, in a mining extraction machine or in a wind turbine.

A large-diameter rolling bearing comprises two concentric inner and outer rings, and at least two rows of rolling elements, such as rollers, arranged between the rings. Such rolling bearings are generally loaded both axially and radially, often with relatively large loads. In this case, reference is made to an orientation roller bearing or slewing roller bearing.

As a result of heavy loads, parts of the rolling bearing, more particularly raceways of the rolling elements, wear out. The wear of the rings and rolling elements leads to a significant increase of the initial bearing clearance. The wear exceeding a certain value can lead to a dramatic bearing failure.

Measuring the wear of the bearing through the clearance increase causing relative axial and radial displacement of the rings helps to predict bearing's residual life.

Such unwanted movements affect to proper functioning of the bearing and the application, with the risk that the bearing rings come in contact and collide. Other elements attached to the bearing rings may also collide.

It is common to replace the bearings when they are worn out. Such maintenance interventions are expensive, especially because of the downtime need for the machines or facilities. It is therefore desirable that such maintenance interventions are timely performed before any contact between the bearing rings, but not too early too.

In order to monitor the bearing condition during its service life, the rolling bearing disclosed in patent application FR-A1-3 041 396 comprises an annular magnetic target fixed to the inner ring, and a sensor mounted on the outer ring and facing the magnetic target. Accordingly, axial and angular relative movements between the inner and outer rings can be detected.

However, this requires the installation of the annular magnetic target on the inner ring that can be several meters diameters.

Reference can also be made to the rolling bearing disclosed in U.S. patent Ser. No. 10/041,545B2 and comprising an encoder provided with a magnetic strip portion attached in a flat manner against the outer ring and cooperating with a sensor fixed to the inner ring.

However, with such arrangement, it is not possible to measure the axial relative movements between the inner and outer rings regardless the rotational position of the rings, but only when the outer ring is on a rotational position with the magnetic strip portion in front of the sensor of the inner ring.

One aim of the present invention is to overcome these drawbacks.

SUMMARY OF THE INVENTION

The invention relates to a bearing comprising a first ring and a second ring capable of rotating concentrically relative to one another.

According to a general feature, at least one annular groove is formed on the second ring and oriented towards the first ring.

According to another general feature, the bearing further comprises at least one target element engaged inside the groove of the second ring while being freely gliding inside the groove in the circumferential direction with respect to the second ring. The target element protrudes into a hole formed on the first ring so that the target element is blocked in rotation by the first ring when the second ring rotates and the first ring is fixed.

The bearing also comprises at least one sensor mounted on the first ring and facing the target element to detect axial positions of the target element. The target element is fixed in the axial direction with respect to the second ring. Axial gaps are provided between the target element and the wall of the hole of the first ring.

Thanks to the invention, an axial relative displacement between the rings can be accurately detected regardless the rotational position of the rings. As a matter of fact, axial position of the gliding target, which axially moves together with the second ring, is detected by the sensor. Besides, there is no need to mount an annular magnetic target on one of the rings. The groove into which is engaged the target element may be easily machined on the associated ring.

Advantageously, the target element is provided with a target having a track coded in the axial direction and facing the sensor. The target element may be further provided with a target holder engaged inside the groove of the second ring and supporting the target.

In one embodiment, the longitudinal axis of the sensor is perpendicular to the axis of the bearing.

Advantageously, the sensor is disposed inside the hole of the first ring. The hole may extend radially from an axial cylindrical surface of the first ring radially facing the second ring, and opens on an opposite axial cylindrical surface located radially on the side opposite to the second ring. Accordingly, the sensor is inserted into the through-hole and arranged in its final position in an easy way. The first ring may further comprise a plug sealing the hole.

Preferably, the sensor is maintained at a fixed distance from the target element.

In one embodiment, the sensor comes into radial contact with the target element. The bearing may further comprise pre-stressing element disposed between the first ring and the sensor to maintain contact between the sensor and the target element. The pre-stressing element exerts a permanent force on the sensor to ensure the radial contact with the target element, notably in case of relative radial displacement between the rings. The pre-stressing element may comprise a spring.

In another embodiment, the sensor remains radially spaced apart from the target element. In this case, the sensor radially faces the target element without contact.

In a particular embodiment, the bearing may further comprise a guideway secured inside the hole of the first ring, a sliding carriage mounted on the guideway, radially moveable relative to the first guideway and onto which is secured the sensor, an additional sensor disposed on one of the sliding carriage and guideway and adapted to detect axial positions of the sliding carriage relative to the guideway, and a pre-stressing element to maintain the radial contact between the target element and the groove. In this particular embodiment, the sensor comes into radial contact with the target element. The pre-stressing element may be radially disposed between the guideway and the sliding carriage.

Accordingly, a radial relative displacement between the rings can also be detected with the radial position of the sliding carriage supporting the sensor relative to the guideway.

In one embodiment, the bearing further comprises at least one row of rolling elements arranged between raceways provided on the first and second rings.

The bearing further may comprise first and second seals disposed between the first and second rings and delimiting together a closed rolling space inside which the row of rolling elements, the sensor and the target element are housed.

In one embodiment, the bearing may further comprise at least one additional seal located inside the closed rolling space and delimiting together with one of the first and second seals a closed detection space inside which opens the groove.

In one embodiment, the bearing comprises at least one row of axial rolling elements arranged between radial raceways provided on the rings, and at least one row of radial rolling elements arranged between axial raceways provided on the rings, the second ring comprising a protruding nose engaged into an annular groove of the first ring and which protrudes radially from an axial cylindrical surface of the second ring, the groove being formed onto the axial cylindrical surface.

The terms "axial rolling elements" is understood to mean rolling elements adapted to accommodate axial loads whereas the terms "radial rolling elements" is understood to mean rolling elements adapted to accommodate radial loads.

The nose of the second ring may be further provided with two opposite radial flanks delimiting axially the axial cylindrical surface, one of the radial flanks delimiting at least partly the radial raceway of the second ring.

In one embodiment, the bearing comprises at least two rows of axial rolling elements each arranged between radial raceways provided on the rings, the two rows of axial rolling elements being disposed axially on each side of the nose of the second ring.

In one embodiment, the sensor may be a magnetic sensor, an inductive sensor or an optical sensor.

BRIEF DESCRIPTION OF THE DRAWINGS

The present invention and its advantages will be better understood by studying the detailed description of specific embodiments given by way of non-limiting examples and illustrated by the appended drawings on which:

FIG. 3 is a partial cross-section of a rolling bearing according to a second example of the invention.

DETAILED DESCRIPTION OF THE INVENTION

Figure 1:
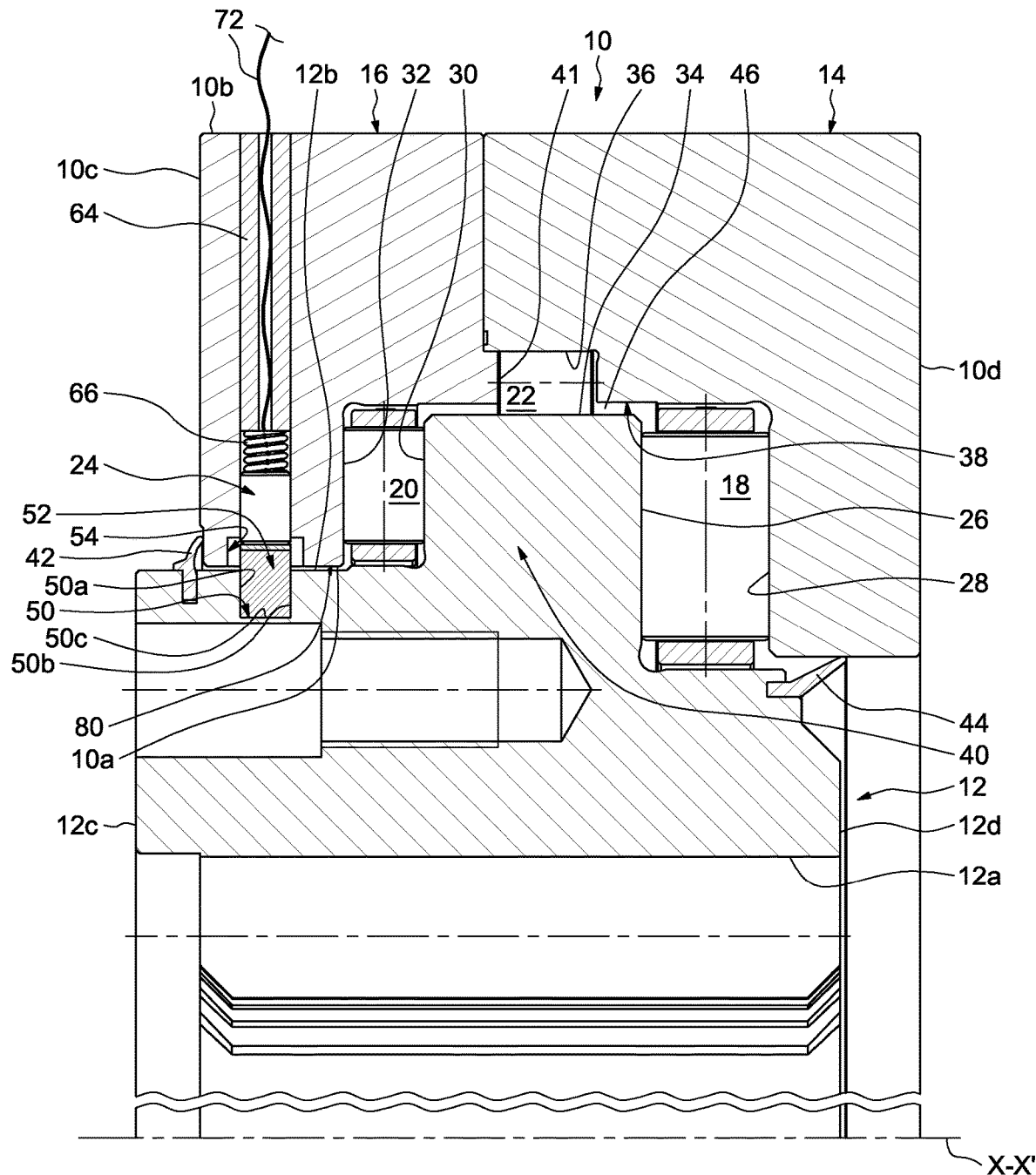
FIG. 1 is a partial cross-section of a rolling bearing according to a first example of the invention.

The rolling bearing as illustrated on FIG. 1 is a large-diameter rolling bearing comprising a first ring 10 and a second ring 12. In the illustrated example, the first ring 10 is the outer ring whereas the second ring 12 is the inner ring. In this example, the inner ring 12 is a rotative ring and the outer ring 10 is a non-rotative ring. The rolling bearing may for example be used in a tunnel boring machine, a wind turbine or any other applications using a large diameter rolling bearing.

The outer and inner rings 10, 12 are concentric and extend axially along the bearing rotation axis X-X' which runs in an axial direction. The rings 10, 12 are of the solid type.

The outer ring 10 is formed as a split ring and comprises a first ring 14 and a second ring 16 stacked one relative to the other in the axial direction. Each of the first and second rings 14, 16 of the outer ring is provided with a plurality of aligned through-holes (not shown) in order to be joined by fitting bolts.

In the illustrated example, the rolling bearing comprises two rows of axial rollers 18, 20 which are arranged between the outer and inner rings 10, 12 in order to form an axial thrust, and a row of radial rollers 22 which are arranged between the rings to form a radial thrust.

As will be described later, the rolling bearing also comprises a sensor 24 for detecting an axial relative displacement between the outer and inner rings 10, 12. In the illustrated example, the sensor 24 is mounted on the outer ring 10.

The rollers 18, 20, 22 of one row are identical to one another. Each roller 18, 20, 22 comprises a cylindrical outer rolling surface and two opposite frontal end surfaces delimiting the outer rolling surface. The axis of rotation of each roller 22 is parallel to the axis X-X' of the bearing and perpendicular to the axes of each or the rollers 18, 20. In the illustrated example, the axial length of the rollers 18 is larger than the one of the rollers 20. Alternatively, the axial length of the rollers 18 may be smaller than, or may be equal to, the one of the rollers 20.

The rollers 18 are arranged axially between annular radial raceways 26, 28 respectively formed on the inner and outer rings 12, 10. Each radial raceway 26, 28 has in cross section a straight internal profile in contact with the rolling surfaces of the rollers 18. The raceways 26, 28 face each other in the axial direction.

The rollers 20 are arranged axially between annular radial raceways 30, 32 respectively formed on the inner and outer rings 12, 10. Each radial raceway 30, 32 has in cross section a straight internal profile in contact with the rolling surfaces of the rollers 20. The raceways 30, 32 axially face each other. The rows of rollers 18, 20 are spaced apart from each other in the axial direction.

The rollers 22 are arranged radially between annular axial raceways 34, 36 respectively formed on the inner and outer rings 12, 10. Each axial raceway 34, 36 has in cross section a straight internal profile in contact with the rolling surfaces of the rollers 22. The raceways 34, 36 face each other in the radial direction. The row of rollers 22 is radially offset outwards with respect to the rows of rollers 18, 20. The row of rollers 22 is axially located between the rows of rollers 18, 20.

The outer ring 10 comprises an annular groove 38 opening in a radial direction inwardly towards the inner ring 12. The outer ring 10 comprises an inner stepped cylindrical surface or bore 10a from which the groove 38 is formed. The outer ring 10 also comprises an outer cylindrical surface 10b which is radially opposite to the bore 10a. The outer ring 10 further comprises two opposite radial frontal surfaces 10c, 10d which axially delimit the bore 10a and the outer surface 10b of the ring.

The inner ring 12 comprises an annular protruding nose 40 engaging into the annular groove 38 of the outer ring. The nose 40 extends radially outwards.

The inner ring 12 comprises an inner cylindrical bore 12a and a stepped outer cylindrical surface 12b which is radially opposite to the bore 12a. In the illustrated example, the bore 12a of the inner ring is provided with a gear teeth (not referenced). The inner ring 12 further comprises two opposite radial frontal surfaces 12c, 12d which axially delimit the bore 12a and the outer cylindrical surface 12b. The protruding nose 40 protrudes radially from the outer cylindrical surface 12b.

The rows of rollers 18, 20 are arranged axially between the nose 40 of the inner ring and the groove 38 of the outer ring. The rows of rollers 18, 20 are disposed on each side of the nose 40 of the inner ring. The radial raceway 26 is located on the nose 40 and on a radial portion of the outer stepped cylindrical surface 12b of the inner ring. Alternatively, the radial raceway 26 may be completely located on the nose 40. The radial raceway 30 is located on the nose 40. The radial raceways 28, 32 are located on the groove 38 of the outer ring.

More precisely, a first radial flank of the nose 40 partly delimits the radial raceway 26 for the rollers 18. A first radial flank of the groove 38, which axially faces the first radial flank of the nose 40, delimits the radial raceway 28 for the rollers 18. A second flank of the nose 40 and a facing second flank of the groove 38 respectively delimits the radial raceways 30, 32 for the rollers 20. The opposite first and second flanks of the nose 40 delimit axially the nose. Similarly, the opposite first and second flanks of the groove 38 delimit axially the groove. Each of the first and second flanks of the nose 40 extends radially the outer cylindrical surface 12b of the inner ring.

The row of rollers 22 is arranged radially between the nose 40 of the inner ring and the groove 38 of the outer ring. The axial raceways 34, 36 are respectively located on the nose 40 and the groove 38. An outer cylindrical surface of the nose 40 delimits the axial raceway 34. The outer cylindrical surface of the nose 40 and the outer cylindrical surface 12b are radially offset. As a result, the axial raceway 34 and the outer cylindrical surface 12b are also radially offset. The outer cylindrical surface of the nose 40 extends axially between the opposite radial flanks of the nose.

An axial bottom of the groove 38 delimits the axial raceway 36. In the illustrated example, an annular slot 41 is formed in the bottom of the groove 38 and delimits the axial raceway 36. The axial raceway 36 radially faces the outer cylindrical surface of the nose 40 onto which is formed the axial raceway 34.

In the illustrated example, the inner ring 12 is made in one part. Alternatively, the inner ring 12 may be divided in the axial direction in at least two separate parts secured together. In another variant, the nose 40 may be made separately from the main part of the inner ring.

As previously mentioned, the outer ring 10 is divided in the axial direction in two separate parts, the first ring 14 and the second ring 16. The first and second rings 14, 16 delimit together the groove 38. The radial raceway 28 is located on the first ring 14 and the radial raceway 32 is located on the second ring 16 of the outer ring.

The rolling bearing further comprises on each side an annular seal 42, 44 mounted on the inner ring 12 and provided to close the radial space that exists between the rings 10, 12. This radial space is defined between the bore 10a of the outer ring, and the outer cylindrical surface 12b and the outer surface of the nose 40 of the inner ring.

A closed space 46 is defined between the inner and outer ring 12, 14 and the seals 42, 44 in which the rows of rolling elements 18, 20 and 22, and the sensor 24 are housed.

Each seal 42, 44 is mounted into a groove (not referenced) formed on the outer cylindrical surface 12b of the inner ring and comes into contact with the outer ring 10. The seal 42 comes into contact with the radial frontal surface 10c of the outer ring. The seal 44 comes into contact with the bore 10a of the outer ring axially near the row of rollers 18. Alternatively, it could be possible to provide a reversed arrangement for at least one of the seals 42, 44 with the seal mounted on the outer ring 10 and coming into friction contact with the inner ring 12.

As previously mentioned, the sensor 24 is provided to detect an axial relative displacement between the outer and inner rings 10, 12. To this end, an annular groove 50 is also formed on the inner ring 12, and the rolling bearing is provided with a gliding target element 52 engaged inside the groove 50. In this example, the sensor 24 radially comes into contact with the target element 52.

In the illustrated example, the groove 50 is formed on the outer cylindrical surface 12b of the inner ring. The groove 50 extends radially inwards from the outer cylindrical surface 12b. The groove 50 is axially delimited by two annular side edges or walls 50a, 50b. The side walls 50a, 50b axially face each other. The side walls 50a, 50b are axially spaced apart from each other. The groove 50 also comprises an annular bottom 50c connected to the side walls 50a, 50b. The outer cylindrical surface 12b of the inner ring and the bottom 50c of the groove are radially offset.

In the illustrated example, the side walls 50a, 50b of the groove extend radially and the bottom 50c extends axially. The groove 50 has a rectangular shape in cross-section. Alternatively, the groove 50 may have other shapes, for example a V-shaped cross-section. In this case, the side walls 50a, 50b of the groove extend obliquely and the groove may be provided with or without the bottom 50c. Alternatively, the groove may comprise an annular tapered bottom connected to one or two radial side walls.

The target element 52 is engaged inside the groove 50 and protrudes into a hole 54 formed on the outer ring 10. The target element 52 radially comes into contact with the bottom 50c of the groove. The target element 52 is not annular. The target element 52 has a limited dimension in the circumferential direction. For example, the target element 52 may extend over an angular sector comprised between 10° and 30°.

The target element 52 is fixed in the axial direction with respect to the inner ring 12. In other words, the target element 52 moves axially together with the inner ring 12. In the illustrated example, the target element 52 is axially blocked by the walls 50a, 50b of the groove.

The target element 52 is freely moveable in rotation with respect to the inner ring 12 inside the groove 50. In other words, the target element 52 is capable of glide inside the groove 50 in the circumferential direction, and is fixed in the axial direction to the inner ring 12 for translation therewith.

As previously mentioned, the target element 52 protrudes into the hole 54 of the outer ring. The target element 52 protrudes radially into the hole 54. The hole 54 radially faces the groove 50 of the inner ring.

Figure 2:
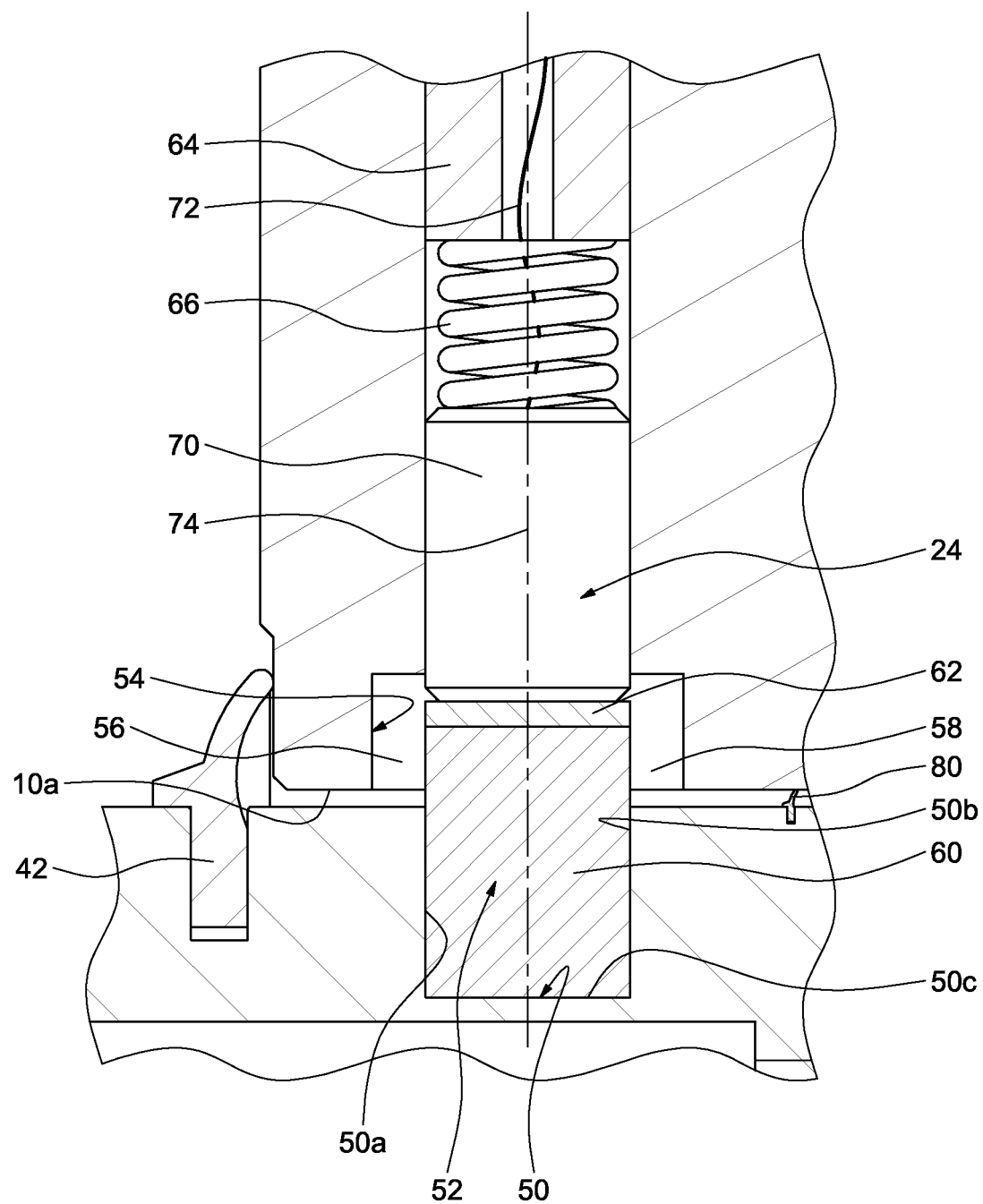
FIG. 2 is a detail view of FIG. 1.

As shown more clearly on FIG. 2, first and second axial gaps 56, 58 are provided between the target element 52 and the internal wall of the hole 54. The first and second axial gaps 56, 58 are provided axially on one each side of the target element 52. Thus, the axial dimension of the part of the target element 52 protruding into the hole 54 is smaller than the axial dimension of the portion of the hole inside which is located the part of the target element.

The hole 54 is sized and shaped to receive the target element 52 and to block in rotation the target element when the inner ring 12 rotates relative to the outer ring 10. The hole 54 is sized larger than the axial dimension and the circumferential dimension of the part of the target element 52 protruding into the hole.

The target element 52 is provided with a target holder 60 engaged inside the groove 50 of the inner ring, and with a target 62 mounted on the target holder and radially coming into contact with the sensor 24.

The target holder 60 protrudes into the hole 54 of the outer ring. The target holder 60 is axially blocked by the walls 50a, 50b of the groove. The target holder 60 radially comes into contact with the bottom 50c of the groove. The target holder 60 has a parallelipipedic form. The target holder 60 may be made of metal or plastic.

In the illustrated example, the target 62 is located inside the hole 54 of the outer ring. The target 26 is here mounted on the outer surface of the target holder 60. The target 62 is secured to the target holder 60 by any appropriate means. The target 62 has a track which is coded in the axial direction and oriented radially towards the sensor 24.

For example, the target 62 is of the magnetic type and comprise positive and negative alternated poles. In this case, the track of the target 62 is magnetically encoded in the axial direction by the succession of positive and negative poles.

The hole 54 of the outer ring extends from the bore 10a and opens on the outer surface 10b (FIG. 1). The sensor 24 is located inside the hole 54. In the illustrated example, the sensor 24 is entirely located inside the hole 54. Alternatively, the sensor 24 may protrude radially into the radial space provided between the outer and inner rings 10, 12. Preferably, the shape of the through-hole 54 is complementary to that of the sensor 24.

In the illustrated example, the hole 54 comprises a first portion (not referenced) extending from the bore 10a and into which protrudes the target element 52, and a second portion (not referenced) extending radially from the first portion and having a reduced size. The sensor 24 is mounted inside the second portion of the hole 54 and protrudes radially inside the first portion of the hole. Alternatively, the hole 54 may comprise a single portion.

The outer ring 10 further comprises a plug 64 which closes and seals the hole 54. The plug 64 is located radially into the through-hole 54. The plug 64 is secured inside the through-hole 54 by any appropriate means, for example by force-fitting. The plug 64 is flush with the outer cylindrical surface 10b (FIG. 1) of the outer ring.

The rolling bearing further comprises a spring 66 radially interposed between the plug 64 and the sensor 24. The spring 66 exerts a radial pre-stressing permanent force on the sensor 24 so as to ensure a constant contact between the sensor 24 and the target element 52. The spring 66 also ensure to maintain the contact between the bottom 50c of the groove and the target element 52.

The spring 66 acts as a pre-stressing element. A first end of the spring 66 bears against the plug 64 and the opposite second end bears against the sensor 24. In the illustrated example, the spring 66 is a compression spring. Alternatively, it could be possible to provide other pre-stressing element to exert a permanent force on the sensor 24, for example an elastic washer, such as a Belleville washer.

The sensor 24 comprises a sensor body 70 mounted inside the through-hole 54 of the outer ring. The sensor body 70 is secured inside the through-hole 54 by any appropriate means, for example by force-fitting. The sensor body 70 radially comes into contact with the target element 52, namely with the target 62. The sensor 24 may be a linear absolute sensor.

In the disclosed example, the sensor 24 also comprises an output connecting cable 72 for transmitting sensing data which extends outwards relative to the sensor body 70. The output cable 72 extends radially outwards. The plug 64 is provided with a through-opening (not referenced) wherein the output cable 72 can go through. The output cable 72 connects the sensor 24 to a control unit (not shown) of the rolling bearing so as to transmit sensed measurements. Alternatively, the sensor 24 may be deprived of such output cable in case of a wireless sensor.

The sensor body 70 of the sensor has a longitudinal axis 74 extending radially. The axis 74 also forms the longitudinal axis of the sensor 24. The axis 74 is perpendicular to the axis X-X' (FIG. 1) of the rolling bearing. The axis 74 is perpendicular to the track of the target 62 of the target element.

The sensor 24 is capable of detecting the magnetic field generated by the target 62 of the target element. For example, the sensor 24 may be for example a Hall-effect sensor.

As previously mentioned, in this example, the inner ring 12 rotates whiles the outer ring 10 remains stationary. During the rotation of the inner ring 12, the target element 52 is blocked in rotation by the wall of the hole 54 of the outer ring. Thus, the inner ring 12 rotates relative to the target element 52 and the outer ring 10.

When an axial displacement of the inner ring 12 relative to the outer rings occurs, this results in a corresponding axial displacement of the target element 52 relative to the sensor 24, which is detected by the sensor 24.

As a matter of fact, the sensor 24 emits signals which correspond to the magnetic encoding of the track of the target 62 of the target element. The control unit connected to the sensor calculates the corresponding value of the axial displacement of the inner ring 12 relative to the outer ring 10.

Axial gaps 56, 58 provided between the target element 52 and the internal wall of the hole 54 enable to avoid axial contacts between the target element and the outer ring 10 when the inner ring 12 moves axially.

Referring once again to FIG. 1, in the illustrated example, the rolling bearing further comprises an additional seal 80 disposed inside the closed space 46 which is delimited by the seals 42, 44. The seal 80 is axially located near to the seal 42. The seal 80 is axially disposed between the seal 42 and the row of axial rollers 20. In the illustrated example, the seal 80 is mounted into a groove (not referenced) formed on the outer cylindrical surface 12b of the inner ring and comes into contact with the outer ring 10. The seal 80 comes into contact with the bore 10a of the outer ring near to the hole 54. Alternatively, the seal 80 may be mounted on the outer ring 14 and come into friction contact with the inner ring 12.

Radially between the outer and inner rings 10 and 12, the seal 80 delimits together with the seal 42 a closed detection space (not referenced) inside which open the groove 50 of the inner ring and the hole 54 of the outer ring. Only the groove 50, the hole 54, the target element 52 and the sensor 24 are located inside the detection space. There is no row of rollers inside the detection space. This reduces the risk that pollution, such as grease, dust, water, reaches the sensor 24.

The example shown on FIG. 3 mainly differs from the first example in that the target element 52 has another design. The target holder 60 of the target element has here a T-shaped cross section.

In this example, the target holder 60 abuts radially against a radial shoulder of the hole 54 foreseen to retain radially the target element 52 inside the hole. A radial gap (not referenced) is here provided between the target holder 60 and the bottom 50c of the groove in case of radial displacement of the inner ring 12 relative to the outer ring 10.

In this example, the target 62 of the target element has also a track which is coded in the axial direction and oriented radially towards the sensor 24. The target 62 may be of the magnetic type and the sensor 24 may be a linear absolute sensor. In this example, a slight radial gap is provided between the target 62 and the sensor 24. Alternatively, the target 62 may radially come into contact against the sensor 24.

Similarly to the first example, when the inner ring 12 rotates, the target element 52 is blocked in rotation by the wall of the hole 54 of the outer ring. Thus, the inner ring 12 rotates relative to the target element 52 and the outer ring 10.

When an axial displacement of the inner ring 12 relative to the outer rings occurs, this results in a corresponding axial displacement of the target element 52 relative to the sensor 24 which is detected by the sensor.

In the illustrated examples, the groove 50 is formed on the outer cylindrical surface 12b of the inner ring axially between the row of axial rollers 20 and the seal 42. Alternatively, according to the design of the rolling bearing, it could be possible to provide the groove 50 on another zone of the outer cylindrical surface 12b, or on the outer cylindrical surface of the nose 40 of the inner ring onto which is formed the axial raceway 34. In this last case, the sensor 24 is axially located between the row of radial rollers 22 and the row of axial rollers 20 or 18.

In the illustrated examples, the target 62 of the target element and the sensor 24 used magnetic technology. Alternatively, the target element and the sensor may use any other suitable technology, for example optic technology.

Otherwise, as previously mentioned, in these illustrated examples, the first ring of the rolling bearing is the fixed outer ring 10 whereas the second ring is the rotative inner ring 12.

As an alternative, it could be possible to provide a reversed arrangement with the first ring forming the fixed inner ring and the second ring forming the rotative outer ring. In this case, the groove 50 is formed on the axial inner cylindrical surface of the outer ring, which forms the bore of the outer ring, and the sensor 24 is mounted on the inner ring.

In the described examples, the rolling bearing is provided with three rows of rolling elements. Alternatively, the rolling bearing may comprise only one row of rolling elements, or two rows of rolling elements, or four or more rows of rolling elements. In the illustrated example, the rolling elements are rollers. The rolling bearing may comprise other types of rolling elements, for example balls. In another variant, the bearing may also be a sliding bearing having no rolling elements.

The invention claimed is:

1. A bearing comprising:
   a first ring and a second ring capable of rotating concentrically relative to one another, wherein
   at least one annular groove is formed on the second ring and oriented towards the first ring,
   at least one target element engaged inside the groove of the second ring while being freely gliding inside the groove in the circumferential direction, the target element protruding into a hole formed on the first ring so that the target element is locked into a predetermined orientation relative to the first ring,
   at least one sensor mounted on the first ring and facing the target element to detect axial positions of the target element, and wherein
   the target element is fixed in the axial direction with respect to the second ring, axial gaps being provided between the target element and the wall of the hole of the first ring.

2. The bearing according to claim 1, wherein the target element is provided with a target having a track coded in the axial direction and facing the sensor.

3. The bearing according to claim 2, wherein the target element is further provided with a target holder engaged inside the groove of the second ring and supporting the target.

4. The bearing according to claim 1, wherein the longitudinal axis of the sensor is perpendicular to the axis of the bearing.

5. The bearing according to claim 1, wherein the sensor mounted on the first ring is located in the hole of the first ring.

6. The bearing according to claim 1, wherein the hole of the first ring extends radially from an axial cylindrical surface of the first ring radially facing the second ring, and opens on an opposite axial cylindrical surface located radially on the side opposite to the second ring.

7. The bearing according to claim 1, wherein the sensor comes into radial contact with the target element.

8. The bearing according to claim 1, further comprising at least one row of rolling elements arranged between raceways provided on the first and second rings.

9. The bearing according to claim 1, further comprising at least one row of axial rolling elements arranged between radial raceways provided on the rings, and at least one row of radial rolling elements arranged between axial raceways provided on the rings, the second ring comprising a protruding nose engaged into a first ring groove and which protrudes radially from an axial cylindrical surface of the second ring, the first ring groove being formed onto the axial cylindrical surface.

* * * * *